Patented Feb. 3, 1925.

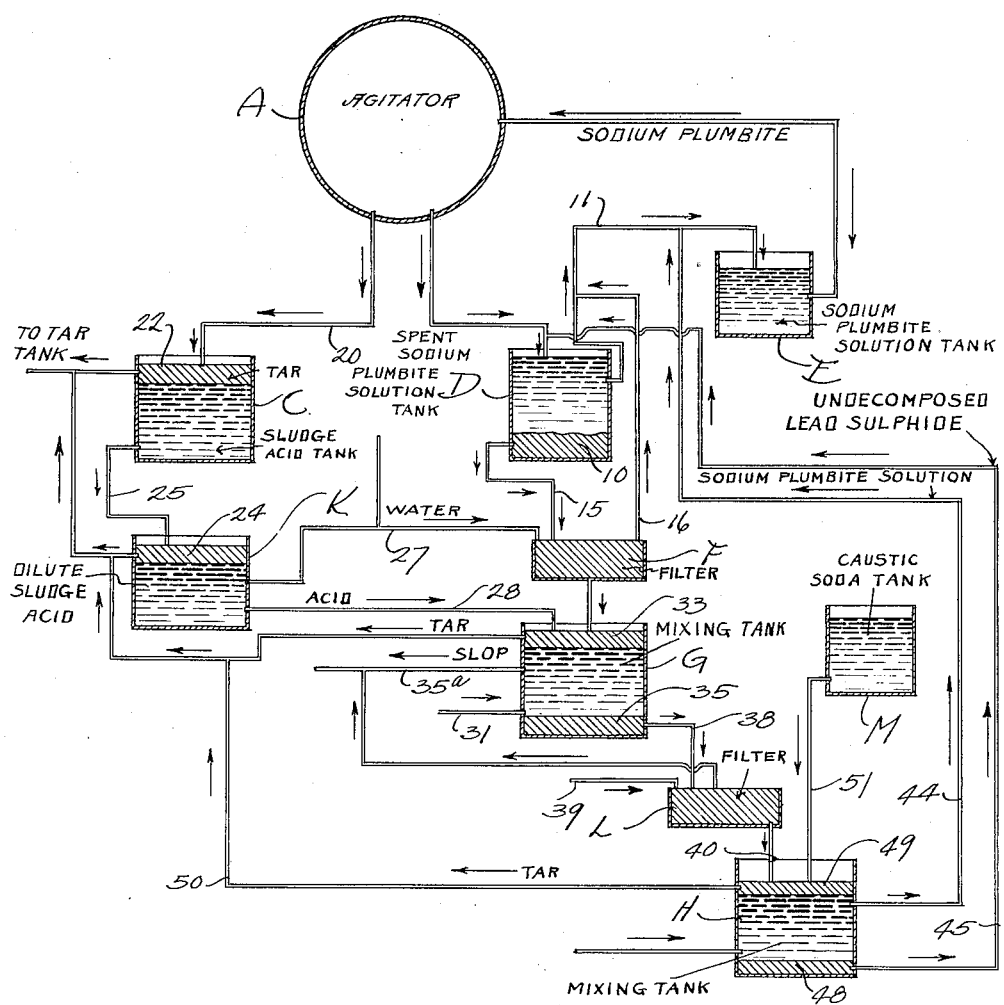

1,525,301

UNITED STATES PATENT OFFICE.

ANTHONY KINSEL, OF EVERETT, MASSACHUSETTS.

PROCESS FOR THE RECOVERY OF SPENT PLUMBITE.

Application filed April 16, 1924. Serial No. 706,999.

*To all whom it may concern:*

Be it known that I, ANTHONY KINSEL, a citizen of Czechoslovakia, residing at Everett, in the county of Middlesex and State of Massachusetts, have invented certain new and useful Improvements in a Process for the Recovery of Spent Plumbite, of which the following is a specification.

This invention relates to a process for the recovery of spent plumbite.

In connection with the distillation of certain crude hydrocarbon oils, the untreated overhead of such distillation, such as gasoline, kerosene, etc., has to be chemically treated or refined, as the distillates are unmarketable on account of bad color and odor. This treatment usually consists of the addition to the distillate in the agitator, of concentrated sulphuric acid, and sodium plumbite solution, sometimes called doctor solution. This sodium plumbite solution (Pb(OH)ONa) is prepared by mixing lead oxide (PbO) with soda solution (NaOH). The sulphuric acid and sodium plumbite solution take out from the untreated oil certain sulphur compounds, present mostly in the form of hydrogen sulphide ($H_2S$). The sulphuric acid after use is called sludge acid, and the used sodium plumbite is termed spent sodium plumbite. Both of these ingredients are waste products, and in the case of the plumbite solution, quite a loss is entailed, as all of the lead present in the plumbite solution is precipitated from it by the sulphur compounds of the oil, in the form of insoluble lead sulphide. It is the primary purpose of this invention to eliminate this loss by converting the lead sulphide in the spent plumbite into lead sulphate, and then into sodium plumbite.

Other objects and advantages of this invention are included in this process, as will be apparent to those skilled in the art to which this invention relates.

In the drawing the view illustrates in diagrammatic form the manner in which the process preferably proceeds, step by step, for the reclamation of sodium plumbite from spent plumbite solution.

In the drawing, wherein similar reference characters designate corresponding parts, and wherein for the purpose of illustration is shown only a referred embodiment of the apparatus which may be used to carry out this process, the letter A may generally designate a tank within which the hydrocarbon distillate is treated. The oil is usually treated first with sodium plumbite solution and then with sulphuric acid. Sometimes the oil is treated first with sulphuric acid and then with sodium plumbite, or sodium plumbite may alone be used. Where they are used together it is customary to place a water wash between them, and the sludge acid and the spent plumbite solution are respectively drawn off from the agitator tank into tanks C and D. The spent plumbite solution in tank D is permitted to settle so that the lead sulphide 10 precipitates to the bottom of the tank or receptacle D. The spent plumbite solution may eventually be boiled in tank D, but such boiling will only be necessary when the lead sulphide does not separate fast enough. Clear solution containing still some sodium plumbite and caustic soda may be pumped from the tank D, through a conduit 11, into a receptacle E, which may be designated as a sodium plumbite solution storage tank.

Lead sulphide, after separation in the tank D is passed through a conduit 15 into the filter F, and the filtrate containing eventually unused sodium plumbite and caustic soda solution is passed through a conduit 16, or the like, directly to the tank or receptacle E. Wash water from the filter still containing some amount of sodium plumbite or caustic soda may enter the same tank E, and clean wash water from the filter F may be conveyed to any suitable source for disposition. The lead sulphide from the filter F is transferred into a tank G, where the most important reaction of the process takes place, in connection with its mixture with sludge acid or sulphuric acid. In this tank G the lead sulphide may be mixed with an excess of sludge acid, either undiluted as it comes from the agitator tank A, or diluted, after separation of tar therefrom, or the lead sulphide may be treated with commercial sulphuric acid, if sludge acid is not available.

Sludge acid is a technical name for sulphuric acid that has been used for the refining of oil. It contains about 70 or 75 percent of sulphuric acid ($H_2SO_4$), the rest of the sludge acid being water and organic matters of no importance in this process, and which may be separated from the sulphuric acid by dilution with water, the organic matter generally being tar, which can be used as fuel or for the manufacturing of asphalt. The sludge acid first enters the sludge acid tank C, through a conduit 20 which leads from the oil treating tank A, and in this tank the sludge acid may settle, so that the tar rises to the top of the tank, as designated by numeral 22 in the drawing, and the sulphuric acid settles to the bottom of the tank. A dilute sludge acid tank K may be provided, which receives sludge acid with a high percentage of sulphuric acid therein from the sludge acid tank C, through a conduit 25. In this tank K water may enter through a conduit 27 for the purpose of more readily separating the organic matter from the sulphuric acid, so that the tar or organic matter 24 rises to the top in the tank K, as is illustrated in the drawing. The diluted sludge acid then enters the treating tank G through a conduit 28, and in which tank the sludge acid or sulphuric acid is mixed with the lead sulphide from the filter F. The following important reaction takes place in tank G $PbS + H_2SO_4 = PbSO_4 + H_2S$. The proportion of sludge acid mixed with the lead sulphide depends on the percentage of sulphuric acid present in the sludge acid, and is calculated from the above reaction. Theoretically 239 parts by weight of lead sulphide require 98 parts by weight of chemically pure sulphuric acid. An excess of acid is however taken to have the reaction as complete as possible. A reaction of secondary importance which takes place in the tank G is that a part of the hydrogen sulphide ($H_2S$) is oxidized by action of sulphuric acid into water and free sulphur, and this reaction takes place at the same time as decomposition of the lead sulphide. An excess of the hydrogen sulphide may be used for the manufacturing of sulphur, sulphuric acid or other sulphur compounds. The mixture in tank G is agitated by air, or by some mechanical means, and eventually heated by steam which enters through a conduit 31. By this reaction lead sulphate is formed. In the tank G the tar or other organic material rises to the top of the tank, as designated by 33 in the drawing. Slop or other discharge may pass from the receptacle or tank G through a conduit 35a, and the lead sulphate 35 settles to the bottom of the tank G, and is from thence passed to a filter L, through a conduit 38.

The lead sulphate is filtered and washed in the filter L, a conduit 39 leading to the filter for supplying water thereto, and the purified lead sulphate is then passed into a mixing tank H, through a conduit 40, and in which tank the lead sulphate is mixed with a quantity of caustic soda, which enters tank H through a conduit 51 from caustic soda tank M, to form a concentrated solution of sodium plumbite which is pumped to the storage tank E through a conduit 44, and a small quantity of eventually undecomposed lead sulphide 48 is transferred to the tank D, through a conduit 45 connecting therewith, wherein it undergoes treatment as above described. Instead of filtering the lead sulphate through the filter L, the lead sulphate may be settled in the tank G, the liquid drawn off, the sediment may be washed with water in the same tank G and a quantity of caustic soda solution be introduced and mixed with the lead sulphate in the same tank G to make sodium plumbite solution.

The slop discharge from the tank G contains weak sulphuric acid and can be used for subsequent dilution of sludge acid, in lieu of water. This slop contains also some of the separated sulphur which can be reclaimed, if desired.

Free sulphur is present suspended in the clean solution discharged into the storage tank E, and an excess of it can be eventually reclaimed. As sulphur is used in helping to precipitate lead sulphide during the process of treating oil in the agitator, there is no necessity for an additional supply of this sulphur when a solution containing free sulphur is used, and consequently there will be a saving of sulphur consumption by using the improved process.

The important reaction which takes place in the mixing tank H is as follows:

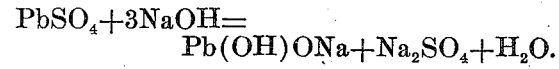
$$PbSO_4 + 3NaOH = Pb(OH)ONa + Na_2SO_4 + H_2O.$$

In this tank H, where the sodium plumbite is formed, the undecomposed lead sulphide 48 goes to the bottom and the tar rises to the top of the tank H, as at 49.

The tar may be withdrawn from the tank C, K, G, and H, as by system of conduits 50, from the foregoing description of this invention the importance of the improved process will be apparent to one skilled in the art to which the invention relates. The saving of lead oxide is of primary importance, as in lieu of a new supply, the same quantity of lead oxide is used over and over again for the subsequent treatments. There is a more economical use of caustic soda than is possible with present methods of treating oil, and the process disposes of all or at least a part of the sludge acid. The process is saving on sulphur consumption, and there is a faster settling of spent plumbite in the agitators, and consequently a shorter time is required for treatment of the hydrocarbon product. The disposal of the lead sulphide settlement is done away with, and this is important, since it plugs up lines, traps, refinery sewers, and pollutes rivers and coast waters if discharged directly thereinto.

While the foregoing sets forth the ingredients and the preferred steps and apparatus for the practicing of this process, it is to be understood that different ingredients which may be differently named, although possessing the same properties or qualities are also comprehended by this invention as well as their equivalents, and variations in the steps of the process, as well as the apparatus, may be made without departing from the spirit of this invention or the scope of the claims.

I claim:

1. That process for the recovery of spent plumbite solution from oil refining which consists of treating the spent plumbite with sludge acid and caustic soda to provide sodium plumbite.

2. That process for the recovery of spent plumbite solution from oil refining which consists of treating the spent plumbite with sulphuric acid and caustic soda to provide sodium plumbite.

3. A process for the recovery of spent plumbite solution from oil refining consisting of mixing lead sulphide from the spent plumbite solution with sulphuric acid to obtain lead sulphate, and adding caustic soda to the lead sulphate to obtain sodium plumbite.

4. That step in the method of recovery of spent plumbite solution from oil refining which consists in combining sludge acid with the spent plumbite.

5. That step in the method of recovery of spent plumbite solution from oil refining and its ingredients which consists of mixing sulphuric acid with spent plumbite.

6. That step in the method of recovery of spent plumbite solution from oil refining which consists in the treatment of sludge acid to separate foreign matter from the sulphuric acid thereof, and adding the sulphuric acid to the spent plumbite to decompose the lead sulphide for the production of lead sulphate.

7. That step in the recovery of spent plumbite solution from oil refining which consists in treating the spent plumbite solution for the settlement of lead sulphide from any clear solution thereof, filtering the lead sulphide, and treating the lead sulphide with sulphuric acid.

8. That step in the recovery of spent plumbite solution from oil refining which consists in treating the spent plumbite solution for the settlement of lead sulphide from any clear solution thereof, filtering the lead sulphide, treating the lead sulphide with sulphuric acid to produce lead sulphate, and adding caustic soda to the lead sulphate to produce sodium plumbite.

ANTHONY KINSEL.